United States Patent [19]

Senuma

[11] 4,326,787

[45] Apr. 27, 1982

[54] MAGNETIZED SHUTTER BLADES

[75] Inventor: Michio Senuma, Tokyo, Japan

[73] Assignee: Canon Kabushiki Kaisha, Tokyo, Japan

[21] Appl. No.: 254,767

[22] Filed: Apr. 16, 1981

[30] Foreign Application Priority Data

Apr. 18, 1980 [JP] Japan .................................. 55-51416

[51] Int. Cl.³ .............................................. G03B 9/40
[52] U.S. Cl. ..................................... 354/246; 354/250
[58] Field of Search ........................ 354/226, 245–250, 354/270, 274; 350/266, 270, 271, 275, 263; 160/168 R, 175, 178 R, 236

[56] References Cited

U.S. PATENT DOCUMENTS 4,051,499  9/1977  Kondo ............................ 354/248 X
4,150,890  4/1979  Nakagawa et al. ............. 354/248 X Primary Examiner—John Gonzales
Attorney, Agent, or Firm—Toren, McGeady & Stanger

[57] ABSTRACT

A camera shutter having a plurality of shutter blades consisting of thin plastic plates operable by means of a comparatively small driving power, so designed that in order to avoid the formation of slits at the overlapped portions of the shutter blades due to deformation magnetic powder is put in the shutter blade and magnetized along the direction of the thickness in such a manner that the blades attract each other by means of magnetic force.

2 Claims, 4 Drawing Figures

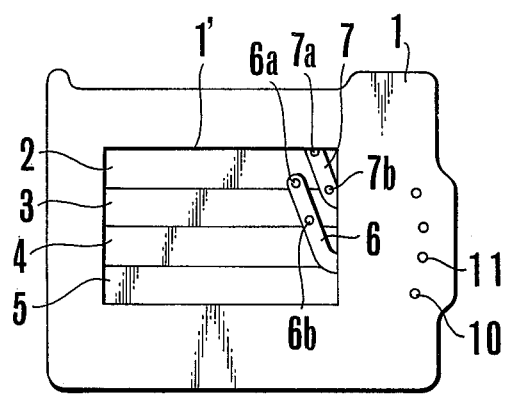
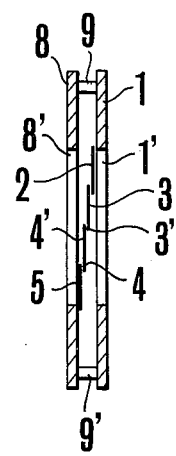
FIG.1(a) FIG.1(b)
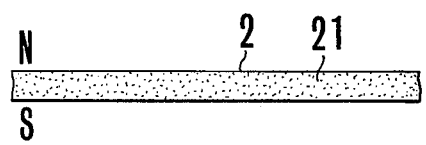
FIG.2
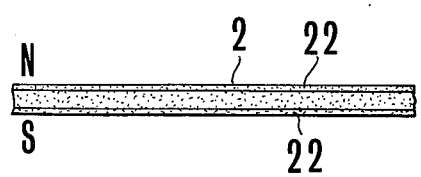
FIG.3

MAGNETIZED SHUTTER BLADES

BACKGROUND OF THE INVENTION

The present invention relates to a camera shutter, particularly to a shutter having light shutter blades capable of being operated by means of a small amount of energy.

Quite recently there has been developed a camera with a built-in automatic winding device which effects film winding and shutter charge by means of a small motor.

In this kind of camera, it is difficult to provide a power source with a large capacity for driving the motor due to restriction of space. Thus, a shutter which can be operated with a small driving power is advantageous in order to keep the power consumption very small.

A shutter whose blades are opened and closed by means of electromagnetic force instead of a conventional spring drive is already known. Even in the case of such a shutter, it is desirable that it be operated by means of a small driving power commensurate with the capacity of the battery.

In order to meet such a demand it has been attempted to develop a light shutter blade and a thin shutter blade or one consisting of light plastic material is being developed. However, in the case of a thin shutter blade or a plastic sheet blade which is opened and closed rapidly, it is difficult to achieve accurate planar machining of the sheet blade, and there is a danger that the shutter blades could be easily deformed or that their parallelism could easily be damaged in such a manner that light leakage is likely take place at the overlapped portion of the shutter blades.

SUMMARY OF THE INVENTION

An object of the present invention is to provide a shutter which can be driven by means of a very small driving force, whereby no light leakage takes place.

Another object of the present invention is to provide light shutter blades consisting of plastics, whereby the blades overlap each other very tightly so as to prevent light leakage.

In order to achieve these objects in accordance with the present invention the shutter blades are made of plastic material mixed with a small amount of magnetic powder and magnetized along the direction of the thickness so that the blades tightly overlap each other.

In another embodiment both surfaces of the plastic shutter blades are provided with light shading coatings mixed with magnetic powder and magnetized along the direction of the thickness so that the shutter blades attract each other at the overlapped portion so as to be light tight.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1(a) is an elevational view showing an embodiment of a lengthwise running slit shutter consisting of divided shutter blades in accordance with the present invention.

FIG. 1(b) is a side view of the embodiment of FIG. 1(a).

FIG. 2 shows an embodiment of the shutter blade in accordance with the present invention in an enlarged section.

FIG. 3 is a sectional view of another embodiment.

DESCRIPTION OF THE PREFERRED EMBODIMENT

In the embodiment described, the present invention is applied to a focal plane shutter having two groups of shutter blades, each consisting of a plural number of such divided shutter blades as is disclosed in USP 4024555.

In FIGS. 1(a) and (b), 1 is the shutter base plate, having an exposure opening 1'. 2, 3, 4 and 5 are the divided shutter blades constituting a group of shutter blades, each rotatably mounted on the two arms 6 and 7 by means of pins 6a, 6b . . . , 7a, 7b . . . , whereby the arms are supported so as to be rotatable around the shafts 10 and 11 provided on the base plates.

Although not shown in the drawing for the sake of simplicity, another similarly composed group of shutter blades is mounted on the above-mentioned base plate.

8 is a cover plate having an exposure opening 8' similar to the base plate 1, being secured on the base plate 1 through spacer 9. In the drawing there is shown a group of shutter blades which cover the opening, whereby when the arms 6 and 7 are rotated around the shafts 10 and 11 by means of a driving means not shown in the drawing, the shutter blades kept in parallel state to each other move downwardly in such a manner that they are folded in the overlapped state over each other at the position out of the opening. Thus, another group of shutter blades not shown in the drawing operates in the same way so as to cover the opening again.

In the state where the shutter covers the opening, the shutter blades overlap over each other at their ends as is shown in FIG. 1(b). However, when the planes of the shutter blades are separated from each other as indicated between the lower end 3' of the second blade 3 and the upper end 4' of the third blade 4, the film is exposed to light due to a slit formed between the blades.

In order to eliminate such a slit to prevent light leakage in accordance with the present invention the shutter blades are magnetized in such a manner that the shutter blades overlap tightly by means of their attractive force.

FIG. 2 shows a shutter blade in accordance with the present invention in section, whereby the shutter blade 2 is a polyester sheet with abt. 0.1 mm thickness, in which there is provided a very small amount (for example abt. 0.1%) of magnetic powder 21 of for example alnico or rare earth matter. The surface of the sheet is treated with black light shading or a reflection prevention coating, while the sheet itself is slightly magnetized along the direction of its thickness. By arranging such shutter blades in such a manner that N and S poles are opposed to each other as is shown in FIGS. 1 (a) and (b), it is possible to avoid such slits as mentioned above, with the shutter blades attracting each other.

Even if very small the magnetic force of the shutter blades is sufficient since the shutter blades will attract each other against the slight elasticity of the blades.

Because at the time of the shutter opening and closing the shutter blades carry out a relative motion along an almost vertical direction perpendicular to that of the magnetic force, the shutter driving force is hardly influenced.

FIG. 3 shows another embodiment, whereby the shutter blade 2' consists of a thickness of abt. 0.1 mm. On both surfaces of the sheet the black light shading and reflection prevention coatings 22 with about 5 μm thickness, being mixed with magnetic powder as mentioned above, are provided and magnetized along the direction of the thickness.

As explained above, the divided shutter blade in accordance with the present invention consists of a light thin plastic sheet, mixed with permanent magnet powder at the formation of the blade and magnetized along the direction of the thickness after the formation in such a manner that the light leakage between the adjacent blades can be sufficiently prevented by means of the attraction between the blades, which is very effective for decreasing the winding torque of the camera as well as for the improvement of the automatic winding mechanism.

While specific embodiments of the invention have been shown and described in detail to illustrate the application of the inventive principles, it will be understood that the invention may be embodied otherwise without departing from such principles.

What is claimed is:

1. In a camera shutter having a plurality of shutter blades which partially overlap each other when an exposure opening in said camera is covered, the improvement comprising that said shutter blades consist of plastic sheets containing magnetic powder and are magnetized along the direction of the thickness thereof in such a manner that each shutter blade attracts the adjacent blade at the overlapped portion.

2. In a camera shutter having a plurality of shutter blades which partially overlap each other when an exposure opening in said camera is covered, the improvement comprising that said shutter blades consist of plastic sheets having both surfaces covered with coatings containing magnetic powder magnetized along the direction of the thickness thereof.

* * * * *